Patented Jan. 14, 1941

2,228,598

UNITED STATES PATENT OFFICE

2,228,598

PURIFICATION OF HYDROCARBON - SULPHUR DIOXIDE - CHLORINE REACTION PRODUCTS

Arthur L. Fox, Woodstown, N. J., Clyde O. Henke, Wilmington, Del., and Cortes F. Reed, Anoka, Minn.; said Reed assignor of one-sixth to Charles L. Horn, Minneapolis, Minn.; said Fox and Henke assignors to E. I. du Pont de Nemours & Company, Wilmington, Del., a corporation of Delaware No Drawing. Application June 30, 1938, Serial No. 216,842

15 Claims. (Cl. 260—513)

This invention relates to the purification of surface-active compounds and compositions which may be obtained by reacting organic compounds, particularly saturated hydrocarbons and hydrocarbon-containing compounds with a mixture of sulphur dioxide and chlorine and hydrolyzing the resulting product. In a more limited sense, it relates to the purification of aforesaid products embodying physical means and to the purified products resulting therefrom.

This invention has for an object the preparation of surface active agents of aforesaid type, which are free from water insoluble compounds. A further object is the preparation of such agents which are of good color and odor. A still further object is the purification of aforedescribed crude hydrolyzed mixtures involving a few economical physical steps.

It is an object of the invention to provide methods of removing the water-insoluble oils from the emulsion obtained when hydrocarbons are treated with a gaseous mixture of sulphur dioxide and chlorine under an accelerating influence and the resulting product is hydrolyzed with hot caustic alkali. More specifically it is an object of the invention to provide methods of removal of this oil by dilution with water and separation, by dilution with water and alcohol and separation, by centrifuging either batch or continuously, by steam distillation, by dilution, separation and distillation, by extraction with an oil dissolving solvent either batch or continuously and with or without the addition of alcohol to break the emulsion of aqueous solution and solvent, by dilution, separation, and extraction, by dilution, separation, and flash distillation or drum or spray-drying, or any combination of these methods. Still other objects will appear hereinafter.

The above and other objects are accomplished by the following invention which comprises the treatment of the crude reaction product obtained by reacting organic compounds, particularly saturated hydrocarbons and hydrocarbon-containing compounds with a mixture of sulphur dioxide and chlorine after the manner set forth in Reed Patent 2,046,090, hydrolyzing and neutralizing the same with caustic alkali solution and removing the water insoluble components. This may be done in a number of ways by diluting with water or a water-soluble organic solvent, and removing the water immiscible layer or by centrifuging with or without dilution, by extraction of the water insoluble portions by means of a water insoluble organic solvent, by steam distillation, or by a combination of such processes. Their preparation may be exemplified by the treatment of a hydrocarbon oil and comprises passing a gaseous mixture of sulphur dioxide and chlorine through such hydrocarbon in the presence of light until the oil has gained a certain weight. This product is hydrolyzed and neutralized with caustic alkali solution. The crude product thus obtained is an aqueous emulsion of sulphonates of the hydrocarbon, unreacted hydrocarbon, chlorinated hydrocarbon, and salts. This starting material may then be purified by the above described processes.

Preferred conditions for carrying out the above reaction are set forth in an application for Letters Patent of A. L. Fox, C. O. Henke, W. H. Lockwood and J. M. Tinker entitled "Improved chemical processes" Serial No. 216,838 filed upon an even date herewith. It is to be understood that the products produced according to the conditions set forth in that case may be further improved and purified by the herein disclosed methods.

The invention will be further illustrated but is not intended to be limited by the following examples in which the parts stated are parts by weight:

Example I

A gaseous mixture of 516 g. of sulphur dioxide and 250 g. of chlorine was bubbled through 300 g. of a white oil (having a Saybolt Universal viscosity of 45 seconds) at a uniform rate over a period of three hours. The temperature of the oil was kept at 44–50° C. during the reaction. The reaction was illuminated with a 60 watt electric light suspended beside the flask. The oil gained 204 g. in weight. The reaction mixture was poured into 520 g. of 30% sodium hydroxide previously heated to 70° C. The reaction is exothermic and the hydrolysis reaction was carried out at 90–95° C. The crude product was a heterogeneous emulsion. 400 g. of the crude material was diluted with 520 cc. of hot water, and let stand over night. An oil layer separated on top. The lower aqueous layer was drawn off and was essentially free of oil. The oil layer weighed 50 g. Instead of sodium hydroxide potassium hydroxide may be used.

Example II

Five hundred grams of refined gas oil having a specific gravity of 0.815 and a boiling point of 312–346° C. was treated by passing a gaseous mixture of sulphur dioxide and chlorine therethrough, the temperature being maintained at 50° C. throughout the reaction. The reaction was continued until the increase in weight of the oil was 639 grams.

Two hundred grams of the thus treated oil was mixed with 200 cc. of water and was thoroughly stirred. The mixture was then heated to the boiling point and hot concentrated 50% sodium hudroxide solution was added in amounts just sufficient to maintain the mixture slightly alkaline for hydrolysis. The hydrolysis was continued for one hour and forty-five minutes. The solution was then diluted to 900 cc. heated to boiling and was allowed to stand over night. An oily layer formed on top and was separated by decantation. The product had good cleansing properties. The aqueous solution was further purified by extraction with carbon tetrachloride. Four one hundred cc. extractions were made successively, the layers were separated after each extraction. About 21 cc. of an oily product was recovered from the carbon tetrachloride. After the aqueous solution was thus extracted it became clear and had excellent foaming and cleansing properties.

*Example III*

Five hundred grams of petroleum ether was reacted with a gaseous mixture of sulphur dioxide and chlorine after the manner set forth in Example I until it increased in weight to about 1024 grams. An equal volume of water, about 1000 cc. were added and the mass was heated. About 1250 cc. of 25% caustic solution were added and the hydrolysis allowed to continue for about two and one-half hours. The excess caustic was neutralized with dilute $H_2SO_4$ and after standing 175 cc. of a yellowish oily substance rose to the surface which was removed.

The aqueous solution was divided into two equal parts which were added to a distillation flask and distilled to dryness under reduced pressure. The distillate consisted of water and an oily substance. The dry product was extracted with alcohol to remove the sulphonates from the inorganic salts formed. The alcohol was removed by distillation and about 800 to 900 grams of a wax-like solid was obtained. This was completely soluble in water, gave no cloudiness and foamed very well. The product has excellent wetting and detergent properties.

*Example IV*

Eight hundred and thirty grams of the sulphonate obtained by treating pentane with a gaseous mixture of sulphur dioxide and chlorine in a manner similar to that in Example I was diluted with 650 cc. of water and 500 cc. of ethyl alcohol. The mixture was stirred and allowed to stand. An oil layer separated on top which weighed 27 g. The aqueous layer was heated to expel the ethyl alcohol. The resulting aqueous solution was clear and essentially free from oil.

*Example V*

Seven hundred and eighty grams of the crude hydrolyzed and neutralized mass resulting from treating Asiatic wax in a manner similar to Example I was centrifuged in a Babcock type centrifuge. An oil layer separated from the emulsion. In this case the oil layer was solid since the starting material, Asiatic wax, has a melting point above room temperature.

The crude hydrolized material as obtained in Example I may be passed through a centrifuge in a continuous process, the unreacted oil passing out one outlet and the aqueous solution of the sulphonate out of the other.

*Example VI*

Five hundred and eleven grams of the crude hydrolyzed mass resulting from treating isooctane in a manner similar to that in Example I was distilled with steam whereupon the unreacted oil distilled over. 59 g. of oil were recovered from the distillate. The sulphonate remaining in the flask gave a clear solution in water. It was an excellent wetting agent for use in mercerizing liquors.

*Example VII*

Five hundred grams of the crude hydrolyzed mass resulting from the treatment of paraffin wax with sulphur dioxide and chlorine as in Example I was diluted with 500 cc. of water. The solution was shaken up with 300 cc. of carbon tetrachloride and an emulsion formed. The emulsion was broken by adding a few cc. of methyl alcohol and the solvent layer drawn off in a separatory funnel. The aqueous solution was extracted twice more with fresh 300 cc. portions of carbon tetrachloride. The solution was heated to remove the methyl alcohol and some emulsified solvent. The resulting sulphonate gave a clear solution in water.

*Example VIII*

One thousand grams of crude hydrolysis product obtained from a mineral white oil (having a Saybolt Universal viscosity of 40) by the method described in Example I was diluted with 1000 cc. of water. This solution was continuously extracted by passing counter-current to a stream of carbon tetrachloride in a glass tube about three feet long. The volume of carbon tetrachloride passed through was 475 cc. Approximately 16 g. of unreacted oil were extracted from diluted crude suljhonates.

In place of the carbon tetrachloride other chlorinated hydrocarbons or other solvents for the unreacted oil and oily products formed may be substituted with good results. As examples of such compounds, mention is made of ethylene dichloride, trichloroethylene, tetrachloroethane, Stoddard solvent, benzene, toluene, xylene and petroleum ether diethyl ether.

*Example IX*

Three hundred grams of a mineral white oil having a Saybolt Universal viscosity of 40 seconds was treated with a gaseous mixture of sulphur dioxide and chlorine in the presence of light and at a temperature of 45–50° until it had gained a weight approximately equal to two-thirds of the original weight of the oil. 669 g. of sulphur dioxide and 254 g. of chlorine were required and were passed through the oil at a uniform rate over a period of three hours. The reaction mass was hydrolyzed and neutralized by pouring it into 485 g. of 30% sodium hydroxide which had previously been heated to 60° C. 800 g. of this crude sulphonate were diluted with 800 cc. of water and allowed to stand over night in a separatory funnel whereupon an oil layer separated on top. The lower aqueous portion was clear and contained only a minor amount of unreacted oil. This was removed by subjecting the aforesaid aqueous layer to distillation. 1524 g. of the aqueous layer were put into a flask provided with a mechanical stirrer and distilled until 720 cc. of water and oil distilled over. The oil layer amounted to about 25 cc. The residue in the flask was diluted with water and gave a clear solution in water and was free from insoluble oils.

Example X

Five hundred grams of a crude sulphonate obtained as in Example IX was diluted with 500 cc. of water and put in a separatory funnel and let stand over night. An oil layer separated on top. The lower aqueous layer was clear and dissolved in water to give a clear solution. However, there was a small amount of unreacted oil emulsified in the product. This was removed by extracting three times with fresh portions of 200 cc. of carbon tetrachloride. The aqueous layer was heated until the small amount of emulsified solvent was removed and a clear solution resulted. A further small amount of oil—about 5 cc. was removed by distilling about 400 cc. of water from the solution. The residue remaining in the distillation flask was diluted with water and a crystal clear yellow solution was obtained.

The purification methods hereof are not to be limited to the specific types of compounds set forth in the specific examples but may be used with various other starting materials. Thus each of the materials set forth in the patents and applications referred to herein may be used. As examples of such additional materials mention is made of saturated hydrocarbons, mineral and vegetable oils and fats, saturated alcohols, ketones, aldehydes, acids, esters and mixtures of two or more of these as well as their substitution products and derivatives, e. g. amides, sulphones, sulphonic acids. These compounds are preferably of high molecular weight, that is they contain at least 8 carbon atoms. As specific examples of such compounds may be mentioned decanol, tetradecanol, hexadecanol, octadecanol, diethyl-heptylcarbinol, diethyl-tridecanol-6, tridecanone-8, heptadecanone-8, nonadecanone-9, pentadecanone-6, stearic lauric, myristic, palmitic, decanoic and erucic acids, methyl stearate, ethyl palmitate, methyl laurate, lard, olive oil, etc.

This invention is not to be limited to the hydrolysis procedure set forth in the examples. For instance, the concentration of caustic soda used for hydrolyzing the reaction product obtained by treating the above described compounds with a gaseous mixture of sulphur dioxide and chlorine may be varied from 5% to 50%. The reaction is somewhat slower with the more dilute caustic soda solutions and almost instantaneous with the more concentrated solutions. Other alkali metal hydroxides such as postassium, calcium, etc. may be used. Likewise, the alkaline earth hydroxides and oxides may be employed. An aqueous solution of ammonium hydroxide may be used to yield the ammonium salt. Substituted ammonium salts or amine salts may be obtained by hydrolyzing the product with aqueous solutions of aliphatic, cycloaliphatic, aromatic and heterocyclic amines, such as dimethylamine, ethylamine, diethylamine and triethanolamine, piperidine, diethyl-cyclohexylamine, pyridine, aniline, toluidine, xylidines, B-napthylamine, etc. Thus, the amine salts of chlor-hydrocarbon sulphonic acid may be obtained. Also, the strong quaternary ammonium bases such as tetra-methyl-ammonium-hydroxide and tetraethyl-ammonium-hydroxide may be used for hydrolysis. The resulting products would be the tetra-methyl-ammonium salt or the tetra-ethyl-ammonium salt of chlor-hydrocarbon sulphonic acid. The preferred salt for use in many arts is the sodium salt. For use in acid or salt solutions one of the amine or quaternary ammonium salts may be more desirable as possessing greater solubility.

Water miscible organic solvents may be used during the hydrolysis or neutralization step to promote contact between the reaction mass and the hydrolyzing agents. As examples of such solvents or diluents may be mentioned ethyl, propyl, methyl, etc., alcohols, dioxane, glycol, and its ethers and esters, e. g. ethylene glycol, diethyl ether, dimethyl ether, etc.

The invention is not to be limited by the above examples as variations may be made without departing from the scope of the invention. For example, two or more of the methods of separation of the water-insoluble oil may be combined. The crude hydrolyzed product may be diluted with an equal volume of water and then instead of letting it stand for the oil layer to separate, it may be passed through a continuous centrifuge whereby the aqueous layer is discharged from one outlet and the oil layer from the other outlet. Or, on the other hand, the crude hydrolized product may be diluted and allowed to stand until the oil layer has separated whereupon the aqueous layer may be withdrawn and subjected to counter current continuous extraction with a solvent to remove the last traces of oil. Again, the crude sulphonate solution may be diluted and the oil layer separated as before and the aqueous layer subjected to flash distillation by either drum or spray drying so that when using such methods the final product is a solid rather than a solution as aforementioned. The product obtained by this latter method is essentially free of water-insoluble oils and gives a clear solution in water. The product is equally as useful as the product obtained by distillation as in Example IX.

The products prepared according to this invention serve as intermediates for the preparation of numerous derivatives such as, for example, hydrocarbon sulphonic acids and salts thereof, sulphonic acids, amides, sulphonyl esters, mercaptans, etc., which may be useful as mercerizing assistants, plasticizers for paints, nitro cellulose lacquers, varnishes, Cellophane, etc., corrosion inhibitors, gum solvents for gasoline and oils, extractants for the refining of gasoline and oils, pour point depressants, insecticides, fly spray ingredients, weed killers, soil fumigants, cotton immunization chemicals, anti-shrinking agents for wool, foaming agents, mold inhibitors, lubricants for steel drawing and metal working, crease-proofing agents, viscose modifiers, pharmaceuticals, detergents, wetting agents, rewetting agents, for improving textile treating processes, including wool scouring, carbonizing, fulling, sizing, desizing, bleaching, mordanting, lime soap dispersing, improvement of absorption, delustering, degumming, kierboiling, felting, oiling, lubricating, resisting cotton in an acid bath, dyeing, printing, stripping, creping, scouring viscose rayon, etc. They may also be useful in improving dye compositions, printing pastes, the preparation of lakes, the preparation of inorganic pigments and household dye preparations. They may also be useful in improving processes of dyeing leather and textiles including dyeing with developed dyes, dyeing in neutral, acid or alkaline dye baths, dyeing of animal fibers with vat dyes, etc. They may also be useful in treating oil wells and to improve flooding oil bearing sands. They may also be used to improve radiator cleaning compositions, shampoos, dentifrices, washing of paper mill felts, etc. They may also be used to improve fat liquoring and leather treatment processes as well as for fat splitting agents. They may be useful in improving the preservation of green fodder. They may also be useful in improving the removal of fibrous layers from surfaces and in metal cleaning. They may also be used to improve flotation processes of ores, pigments, coal, etc. They may be useful in breaking petroleum emulsions or in different concentrations as emulsifying agents. They may also be useful in improving food preparations. They may be useful in improving the cooking of wood pulp. They may also be useful in providing improved ceramic assistants and processes to improve the setting of cement. They may be useful in storage batteries and dry cells. Other uses for these products or their derivatives are as fungicides, accelerators, delusterants, extreme pressure lubricants, moth proofing agents, antiseptics, fireproofing agents, mildew preventers, penetrating agents, anti-flexing agents, tanning agents, lathering agents, dust collecting agents, antioxidant, color stabilizer in gasoline, etc.

The surface activity of some of the agents may be enhanced by electrolytes or by the addition of other surface-active agents, e. g. alkylated naphthalene sulphonic acids and their water-soluble salts, salts of higher alkyl sulphonic acid esters as described in Bertsch Patents Nos. 1,968,794 to 1,968,797, long chain betaine derivatives both of the C- and N- and open type which are illustrated by Daimler et al. Patent No. 2,082,275, Balle et al. 2,087,565, Platz et al. Patent 2,097,864 and Balle et al. 2,101,524, long chain ammonium, sulphonium and phosphonium compounds, as well as numerous other soap substitutes.

The hydrolysis products or water-soluble salts of the above described sulphonyl chlorides which have surface active properties may be used in admixture with one another and/or in admixture with soap and/or soap substitutes of the prior art, for various purposes wherein soap and/or soap substitutes have previously been used or are capable of use. A few representative uses are set forth in Reed application, Serial No. 216,332 and it is to be understood that the products produced according to this invention may be substituted in like amount for the products of each of the examples of that case.

As many apparently widely different embodiments of this invention may be made without departing from the spirit and scope thereof, it is to be understood that we do not limit ourselves to the specific embodiments thereof except as defined in the appended claims.

We claim:

1. A process which comprises removing the water insoluble components from the crude reaction mixture obtained by reacting a non-gaseous organic compound containing a hydrocarbon radical of at least 5 carbon atoms with a gaseous mixture of sulphur dioxide and chlorine and hydrolyzing the resulting product; by diluting the reaction mass with a liquid diluent and separating said components by physical means.

2. A process which comprises removing the water insoluble components from the crude reaction mixture obtained by reacting a non-gaseous saturated hydrocarbon with a gaseous mixture of sulphur dioxide and chlorine and hydrolyzing with an aqueous alkaline liquid the resulting product; by diluting the reaction mass with a liquid diluent and separating said components by physical means.

3. A process which comprises removing the water insoluble components from the crude reaction mixture obtained by reacting a non-gaseous saturated hydrocarbon in the liquid state with a gaseous mixture of sulphur dioxide and chlorine and hydrolyzing and neutralizing the resulting product; by diluting the reaction mass with a liquid diluent and separating said components by physical means.

4. A process which comprises removing the water insoluble components from the crude reaction mixture obtained by reacting a non-gaseous saturated hydrocarbon in the liquid state with a gaseous mixture of sulphur dioxide and chlorine and hydrolyzing the resulting product; by diluting the product with a diluent taken from the group consisting of water and water-soluble solvents and separating the water insoluble layer.

5. A process which comprises removing the water insoluble components from the crude reaction mixture obtained by reacting a mixture of non-gaseous saturated hydrocarbons with a gaseous mixture of sulphur dioxide and chlorine and hydrolyzing the resulting product; by diluting the product with a diluent taken from the group consisting of water and water-soluble solvents and separating the water insoluble layer.

6. A process as set forth in claim 4 wherein the layers are separated by centrifuging.

7. A process as set forth in claim 5 wherein the layers are separated by centrifuging.

8. A process which comprises removing the water insoluble components from the crude reaction mixture obtained by reacting a non-gaseous saturated hydrocarbon in the liquid state with a gaseous mixture of sulphur dioxide and chlorine and hydrolyzing the resulting product by extracting the water insoluble portion with a solvent capable of dissolving hydrocarbons.

9. A process which comprises removing the water insoluble components from the crude reaction mixture obtained by reacting a mixture of non-gaseous saturated hydrocarbons in the liquid state with a gaseous mixture of sulphur dioxide and chlorine and hydrolyzing the resulting product by extracting the water insoluble portion with a solvent capable of dissolving hydrocarbons.

10. A process as set forth in claim 8 wherein the extraction is continuous and counter current.

11. A process which comprises removing the water insoluble components from the crude reaction mixture obtained by reacting a non-gaseous saturated hydrocarbon in the liquid state with a gaseous mixture of sulphur dioxide and chlorine and hydrolyzing the resulting product by steam distilling off the water insoluble components.

12. A process which comprises removing the water insoluble components from the crude reaction mixture obtained by reacting a mixture of non-gaseous saturated hydrocarbons with a gaseous mixture of sulphur dioxide and chlorine and hydrolyzing the resulting product by steam distilling off the water insoluble components.

13. A process which comprises removing the water insoluble components from the crude reaction mixture obtained by reacting a non-gaseous organic compound containing a hydrocarbon radical of at least 5 carbon atoms with a gaseous mixture of sulphur dioxide and chlorine and hydrolyzing the resulting product with an aqueous alkaline liquid diluting the reaction material with a liquid diluent and separating said component by physical means and drying the aqueous fraction.

14. A process which comprises removing the water insoluble components from the crude reaction mixture obtained by reacting a non-gaseous saturated hydrocarbon with a gaseous mixture of sulphur dioxide and chlorine and hydrolyzing the resulting product with an aqueous alkaline solution diluting the hydrolysis product with an aqueous liquid; and drying the water-soluble fraction so removed.

15. A process which comprises removing the water insoluble components from the crude reaction mixture obtained by reacting a non-gaseous organic compound containing a hydrocarbon radical of at least 5 carbon atoms with a mixture of sulphur dioxide and chlorine and hydrolyzing the resulting product; by diluting the reaction mass with a liquid diluent and separating said components by physical means.

ARTHUR L. FOX.
CLYDE O. HENKE.
CORTES F. REED.

CERTIFICATE OF CORRECTION.

Patent No. 2,228,598.                                         January 14, 1941.

ARTHUR L. FOX, ET AL.

It is hereby certified that error appears in the printed specification of the above numbered patent requiring correction as follows: Page 2, second column, line 39, for "suljhonates" read --sulphonates--; page 3, first column, line 68, after "for" insert --the--; and second column, line 39-40, for "sulphonic" read --sulphinic--; page 4, first column, line 25, for "sulphonic" read --sulphuric--; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.